(12) United States Patent
Ta (10) Patent No.: US 10,142,504 B2
(45) Date of Patent: Nov. 27, 2018

(54) IMAGE FORMING APPARATUS

(71) Applicant: KYOCERA Document Solutions Inc., Osaka (JP)

(72) Inventor: Tuan Anh Quang Ta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/666,996

(22) Filed: Aug. 2, 2017

(65) Prior Publication Data

US 2018/0041653 A1 Feb. 8, 2018

(30) Foreign Application Priority Data

Aug. 4, 2016 (JP) .................................. 2016-153774

(51) Int. Cl.
*H04N 1/00* (2006.01)

(52) U.S. Cl.
CPC ..... *H04N 1/00697* (2013.01); *H04N 1/00037* (2013.01); *H04N 1/0061* (2013.01);
(Continued)

(58) Field of Classification Search
CPC ............ B65H 2220/01; B65H 2220/02; B65H 2220/03; B65H 2511/413; B65H 2511/414; B65H 2511/51; B65H 2220/11; B65H 43/04; B65H 5/062; B65H 2511/20; B65H 2701/1912; B65H 2405/111; B65H 2511/10; B65H 2511/11; B65H 2511/17; B65H 2511/24; B65H 2511/30; B65H 2511/411; B65H 2511/512; B65H 2511/515; B65H 2511/521; B65H 2511/522; B65H 2511/526; B65H 2513/41; B65H 2513/412; B65H 2513/42; B65H 2513/514; B65H 2515/60; B65H 2701/1311; B65H 2701/1313; B65H 31/24; B65H 7/02; B65H 7/20; B65H 2301/331; B65H 2513/512; B65H 2557/23; B65H 2801/06; B65H 2801/27; B65H 37/04; B65H 43/06; B65H 5/26; B65H 7/06; B65H 85/00; B65H 1/04; B65H 2301/5111; B65H 2301/5123; B65H 2301/5142; B65H 2301/517; B65H 23/26; B65H 2402/10; B65H 2402/32; B65H 2402/411;
(Continued)

(56) References Cited

U.S. PATENT DOCUMENTS

2007/0081068 A1* 4/2007 Nakamura ................. B41J 2/45
347/133
2008/0252926 A1* 10/2008 Minamino ............. H04N 1/203
358/1.15
(Continued)

FOREIGN PATENT DOCUMENTS

JP H10-024632 A 1/1998

*Primary Examiner* — Negussie Worku
(74) *Attorney, Agent, or Firm* — Studebaker & Brackett PC (57) ABSTRACT

An image forming apparatus includes a feed tray having a placement surface on which a sheet is placed. The feed tray includes a fixed table, an extension table, and a sensor. The extension table is capable of being pulled out along and being accommodated in the fixed table. The sensor is disposed on the fixed table and detects whether or not the sheet is placed on the extension table in a situation in which the extension table is pulled out.

9 Claims, 8 Drawing Sheets

(52) U.S. Cl.
CPC ..... *H04N 1/00604* (2013.01); *H04N 1/00734* (2013.01); *H04N 2201/0094* (2013.01)

(58) Field of Classification Search
CPC .......... B65H 2403/72; B65H 2403/942; B65H 2404/1351; B65H 2404/1441; B65H 2404/1442; B65H 2404/1451; B65H 2404/147; B65H 2404/632; B65H 2405/15; B65H 2405/332; B65H 2406/211; B65H 2407/21; B65H 2511/52; B65H 2553/414; B65H 2553/42; B65H 2553/43; B65H 2557/13; B65H 2701/111; B65H 27/00; B65H 2801/39; B65H 29/001; B65H 29/58; B65H 31/00; B65H 31/10; B65H 31/18; B65H 37/00; B65H 37/06; B65H 43/00; B65H 45/30; B65H 5/06; B65H 5/068; B65H 5/24; B65H 5/36; B65H 5/38; H04N 2201/094; H04N 13/0059; H04N 13/0239; H04N 13/0242; H04N 1/00334; H04N 1/00037; H04N 1/00339; H04N 1/00342; H04N 1/00604; H04N 1/0057; H04N 1/00734; H04N 1/121; H04N 13/0048; H04N 13/0278; H04N 13/044; H04N 13/0484; H04N 13/0495; H04N 13/0497; H04N 1/00; H04N 1/00002; H04N 1/00092; H04N 1/00161; H04N 1/0019; H04N 1/00196; H04N 13/02; H04N 1/0032; H04N 1/00344; H04N 1/00381; H04N 1/00411; H04N 1/00413; H04N 1/0044; H04N 1/00456; H04N 1/00472; H04N 1/00474; H04N 1/00477; H04N 1/00503; H04N 1/00538; H04N 1/00588; H04N 1/00602; H04N 1/0061; H04N 1/00633; H04N 1/00641; H04N 1/00681; H04N 1/00694; H04N 1/00697; H04N 1/00708; H04N 1/00724; H04N 1/00742; H04N 1/00745; H04N 1/00779; H04N 1/00806; H04N 1/0405; H04N 1/047; H04N 1/1061; H04N 1/12; H04N 1/2038; H04N 1/3878; H04N 1/4078; H04N 1/4426; H04N 2013/0081; H04N 21/414; H04N 21/47202; H04N 2201/0082; H04N 221/0422; H04N 2213/001; H04N 5/2251; H04N 5/2252; H04N 5/2253; H04N 5/23238; H04N 5/247; H04N 5/3415; H04N 7/18; H04N 7/183; H04N 7/185; H04N 1/00251

USPC ..... 358/1.15, 1.12, 1.14, 488; 271/176, 215, 271/264, 272; 399/113, 341, 49, 69, 81

See application file for complete search history.

(56) References Cited

U.S. PATENT DOCUMENTS

| | | | |
|---|---|---|---|
| 2009/0057989 A1* | 3/2009 | Fuchi | B65H 1/08 271/147 |
| 2011/0222095 A1* | 9/2011 | Sheng | H04N 1/00408 358/1.13 |
| 2013/0077139 A1* | 3/2013 | Oosaki | H04N 1/4072 358/505 |
| 2013/0302055 A1* | 11/2013 | Soda | G03G 15/2078 399/69 |
| 2014/0294404 A1* | 10/2014 | Aratachi | G03G 21/1676 399/12 |
| 2015/0353314 A1* | 12/2015 | Wada | B65H 29/125 271/176 |
| 2017/0107066 A1* | 4/2017 | Masuda | B65H 1/04 |
| 2017/0183190 A1* | 6/2017 | Matsuki | B65H 33/08 |
| 2017/0374215 A1* | 12/2017 | Sheng | H04N 1/00604 |
| 2017/0374232 A1* | 12/2017 | Yoshida | H04N 1/00344 |
| 2018/0072522 A1* | 3/2018 | Shiokawa | B65H 7/02 |

* cited by examiner

IMAGE FORMING APPARATUS

INCORPORATION BY REFERENCE

The present application claims priority under 35 U.S.C. § 119 to Japanese Patent Application No. 2016-153774, filed on Aug. 4, 2016. The contents of this application are incorporated herein by reference in their entirety.

BACKGROUND

The present disclosure relates to an image forming apparatus.

A manual feed tray of some image forming apparatus includes a fixed table, an extension table, a paper sensor, a first fixing member, a second fixing member, a support member, and an urging section. The sheet sensor is disposed on the extension table and detects the presence or absence of paper placed on the extension table. The paper sensor includes a wire. The wire extends from the paper sensor to the fixing table. The first fixing member fixes a part of the wire to the fixed table. The support member is long in shape and pivots about one end thereof as a pivot. The second fixing member fixes part of the wire to the support member. The urging section urges the wire fixed to the support member in a direction in which the wire is pulled toward the extension table.

When the extension table is accommodated under the fixed table, the wire is drawn toward the extension table. When the extension table is pulled out along the fixed table, the other end of the support member is pulled by the fixed table such that the wire is let out of the extension table toward the fixed table.

SUMMARY

An image forming apparatus according to the present disclosure includes a feed tray having a placement surface on which a sheet is placed. The feed tray includes a fixed table, an extension table, and a sensor. The extension table is capable of being pulled out along and accommodated in the fixed table. The sensor detects whether or not the sheet is placed on the extension table in a situation in which the extension table is pulled out. The sensor is disposed on the fixed table.

DETAILED DESCRIPTION

The following describes an embodiment of the present disclosure with reference to the drawings (FIGS. 1-8). It should be noted that elements in the drawings that are the same or equivalent are labelled using the same reference signs and description thereof is not repeated.

Figure 1:
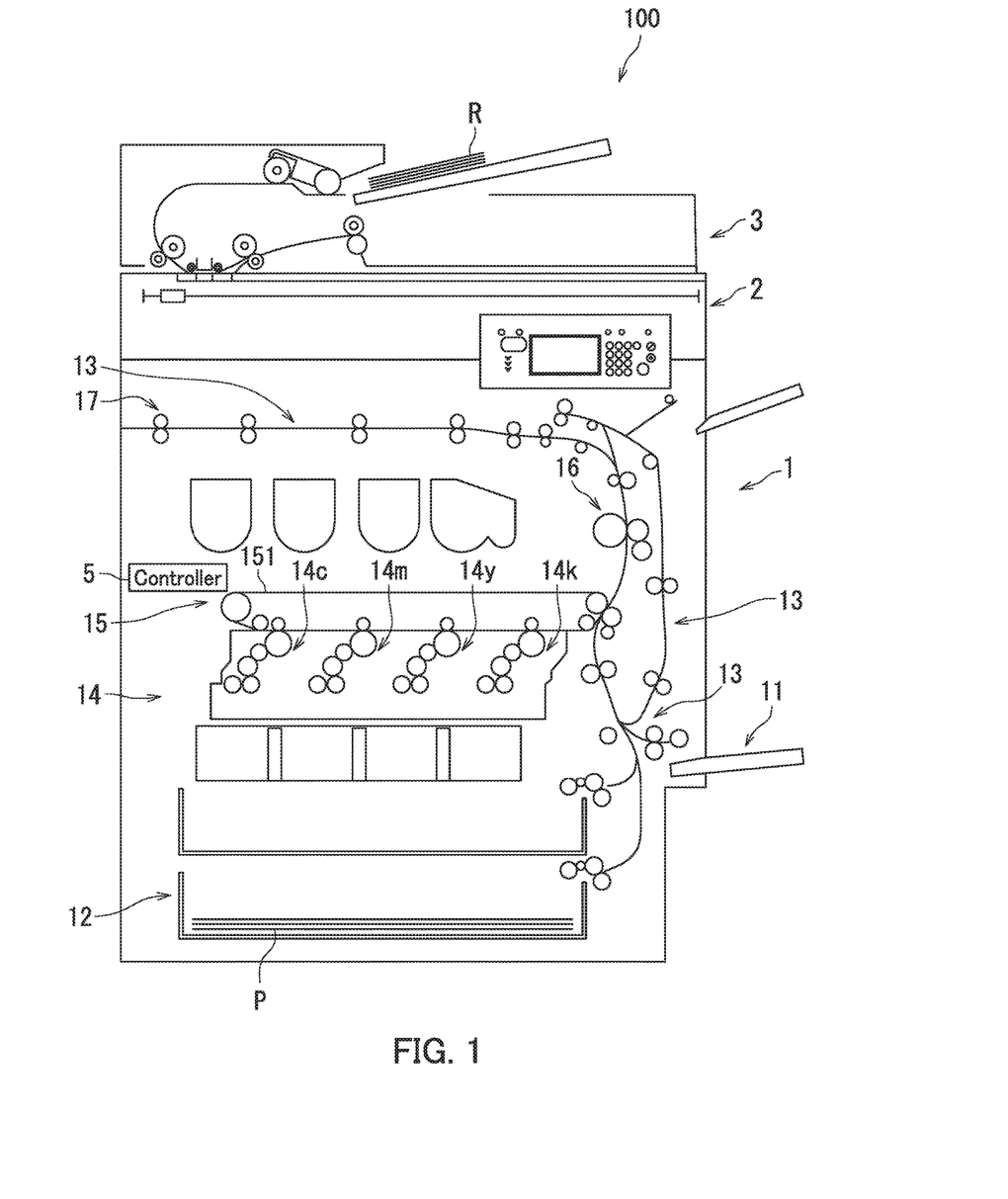
FIG. 1 illustrates configuration of an image forming apparatus according to an embodiment.

An image forming apparatus 100 according to the present embodiment will be described first with reference to FIG. 1. FIG. 1 illustrates configuration of the image forming apparatus 100. As illustrated in FIG. 1, the image forming apparatus 100 is a multifunction peripheral. The image forming apparatus 100 includes an image forming unit 1, an image reading unit 2, a document conveyance unit 3, and a controller 5.

The image forming unit 1 forms an image on a piece of paper P. The image forming unit 1 includes a manual feed tray 11, a feeder 12, a conveyor device 13, an image forming device 14, a fixing device 16, and an ejection device 17. The image forming device 14 includes a transfer device 15.

The manual feed tray 11 feeds paper P one piece at a time to the conveyor device 13. The feeder 12 feeds the paper P to the conveyor device 13. The conveyor device 13 conveys the paper P to the ejection device 17 via the transfer device 15 and the fixing device 16. The paper P corresponds to an example of a "sheet".

The image forming device 14 forms an image on the paper P. The image forming device 14 includes an image forming device 14c, an image forming device 14m, an image forming device 14y, and an image forming device 14k.

The transfer device 15 includes an intermediate transfer belt 151. The image forming devices 14c-14k transfer a cyan toner image, a magenta toner image, a yellow toner image, and a black toner image to the intermediate transfer belt 151, respectively. The toner images in the respective colors are superposed on the intermediate transfer belt 151 with a result that an image is formed on the intermediate transfer belt 151. The transfer device 15 transfers the image formed on the intermediate transfer belt 151 to the paper P. As a result, the image is formed on the paper P.

The fixing device 16 fixes the image formed on the paper P to the paper P by applying heat and pressure to the paper P. The ejection device 17 ejects the paper P out of the image forming apparatus 100.

The controller 5 controls operation of the image forming unit 1, the image reading unit 2, and the document conveyance unit 3. Specifically, the controller 5 includes a processor and a storage. The storage stores control programs therein. The processor controls the operation of the image forming unit 1, the image reading unit 2, and the document conveyance unit 3 through execution of the control programs.

Figure 2:
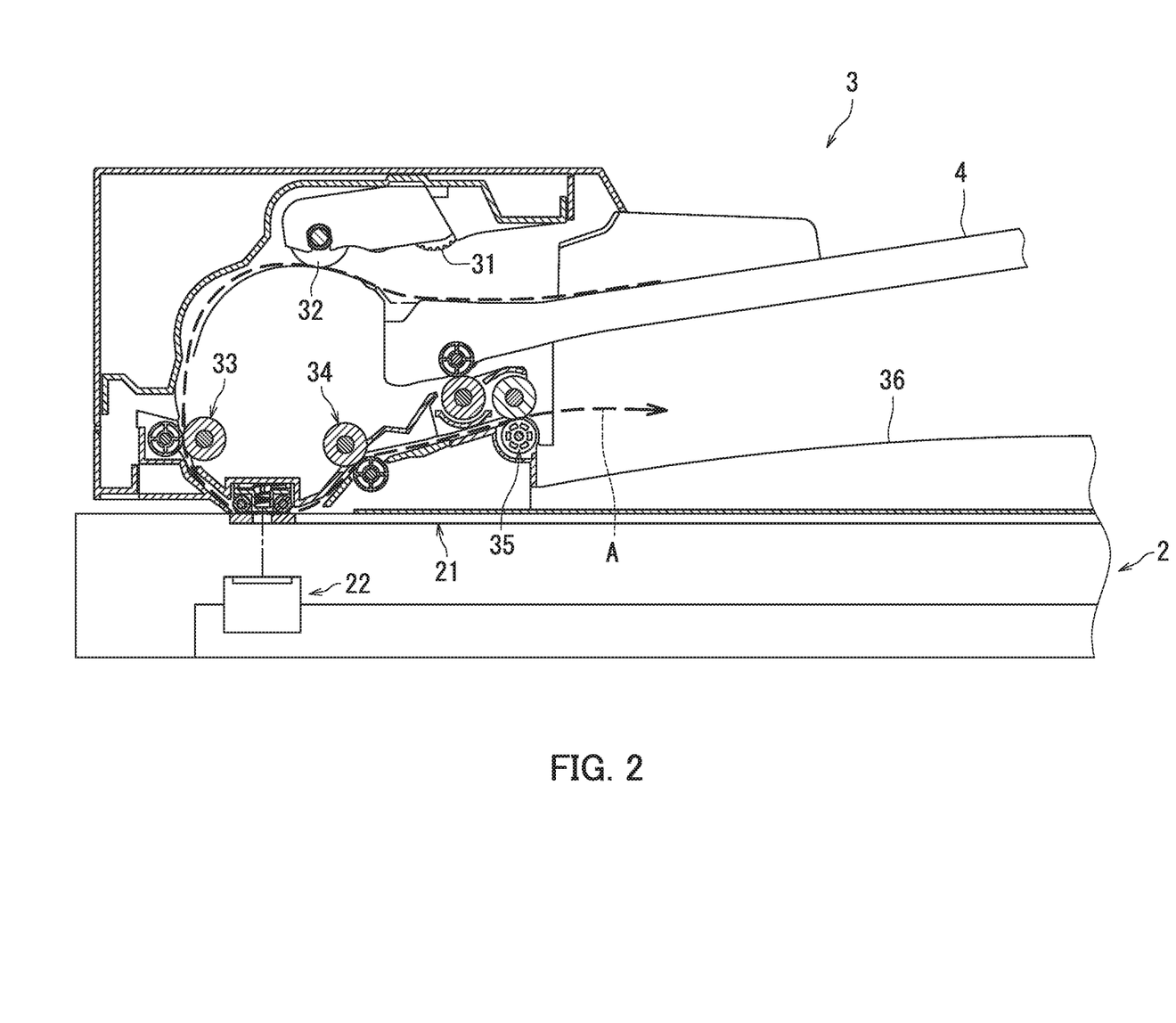
FIG. 2 illustrates an image reading unit and a document conveyance unit according to the embodiment.

Configuration of the image reading unit 2 and the document conveyance unit 3 according to the present embodiment will be described next with reference to FIGS. 1 and 2. FIG. 2 is a side view illustrating the image reading unit 2 and the document conveyance unit 3. As illustrated in FIG. 2, the image reading unit 2 includes a contact glass 21 and an image reading section 22. An original document R is placed on the contact glass 21. The original document R corresponds to an example of a "sheet".

The image reading section 22 reads an image formed on the original document R through the contact glass 21. Specifically, the image reading section 22 includes a light emitting section such as a light emitting diode (LED) and an imaging section such as an image sensor. The image reading section 22 is a contact image sensor (CIS) unit in the present embodiment. A charge coupled device (CCD) sensor or a lens system may be provided in place of the CIS unit.

The image reading section 22 reads the image on the original document R placed on the contact glass 21 while moving in a sub-scanning direction. The sub-scanning direction is a direction perpendicular to a main scanning direction.

The document conveyance unit 3 conveys the original document R to the image reading section 22. The document conveyance unit 3 includes a feed tray 4, a pickup roller 31, a feeding roller 32, a registration roller pair 33, a conveyance roller pair 34, an ejection roller pair 35, and a document exit tray 36. The document conveyance unit 3 constitutes an auto document feeder (ADF). A dashed arrow A in FIG. 2 indicates a conveyance route of the original document R. A combination of the pickup roller 31, the feeding roller 32, the registration roller pair 33, the conveyance roller pair 34, and the ejection roller pair 35 corresponds a "sheet conveyor device".

A plurality of original documents R are placed on the feed tray 4. The pickup roller 31 picks up a topmost original document R among the plurality of original documents R one at a time and feeds each of the original documents R to the feeding roller 32. The feeding roller 32 feeds the original document R to the registration roller pair 33.

The registration roller pair 33 feeds the original document R to the contact glass 21 at a specific timing. When the original document R passes over the contact glass 21, the image reading unit 2 reads the image formed on the original document R. The conveyance roller pair 34 then conveys the original document R to the ejection roller pair 35. The ejection roller pair 35 ejects the original document R onto the document exit tray 36.

Figure 3:
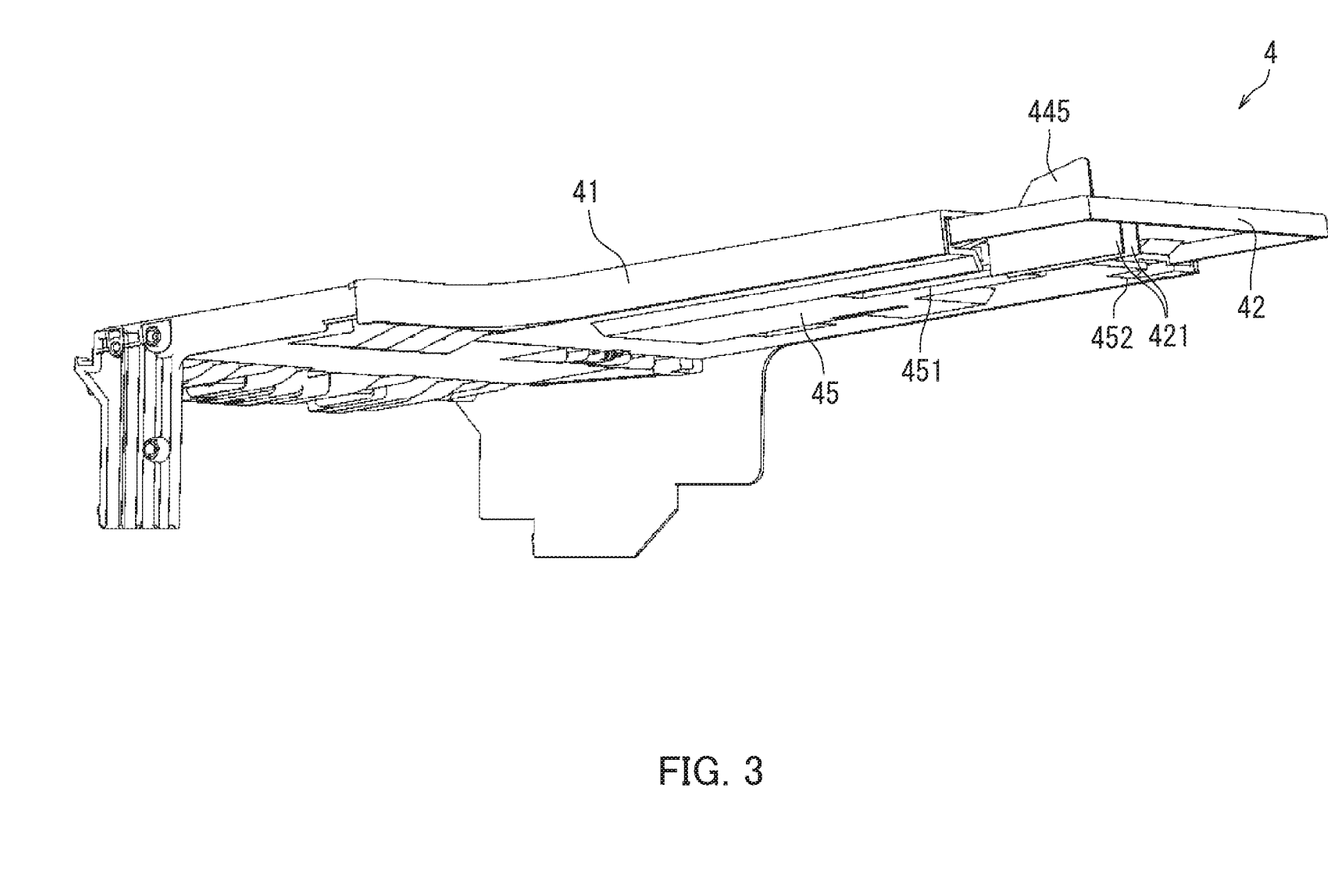
FIG. 3 is a perspective view of a feed tray according to the embodiment.

The feed tray 4 according to the present embodiment will be described next with reference to FIG. 3. FIG. 3 is a perspective view of the feed tray 4. As illustrated in FIG. 3, the feed tray 4 includes a fixed table 41, an extension table 42, a lower cover 45, and a protruding member 445.

A plurality of original documents R are placed on the fixed table 41. The fixed table 41 has a lower surface to which the lower cover 45 is attached so as to face to the fixed table. The fixed table 41 supports the extension table 42 such that the extension table 42 is capable of being pulled out therealong and being accommodated therein. The extension table 42 is accommodated in a space defined between the fixed table 41 and the lower cover 45.

The lower cover 45 is a member having a substantially flat plate shape. The lower cover 45 is attached to a part of the lower surface of the fixed table 41 that ranges from a vicinity of a central part to a downstream end of the fixed table 41 in a conveyance direction of the original document R. A first concave cut 451 and a second concave cut 452 are formed in the downstream end of the lower cover 45 in the conveyance direction of the original document R. The first concave cut 451 is located in correspondence with the protruding member 445 in the vicinity of one end of opposite ends of the lower cover 45 in a width direction of the original document R. The second concave cut 452 is located away from the first concave cut 451 toward the other end of the lower cover 45 in the width direction of the original document R. A user holds a part of the extension table 42 that is exposed through the second concave cut 452 in order to pull out the extension table 42 accommodated between the fixed table 41 and the lower cover 45.

The extension table 42 is capable of being pulled out along and being accommodated in the fixed table 41. In a situation in which an original document R having a size larger than a predetermined size is placed on the feed tray 4, the extension table 42 is pulled out along the fixed table 41. The predetermined size is for example A4 size defined in International Organization for Standardization (ISO) 216. The size larger than the predetermined size is for example A3 size defined in ISO 216.

The protruding member 445 is a plate-shaped member protruding upward from a placement surface of the extension table 42. The placement surface is an upper surface of the extension table 42. The protruding member 445 protrudes substantially in a perpendicular direction relative to the placement surface of the extension table 42. The protruding member 445 is capable of protruding from and receding below the placement surface of the extension table 42.

Figure 4:
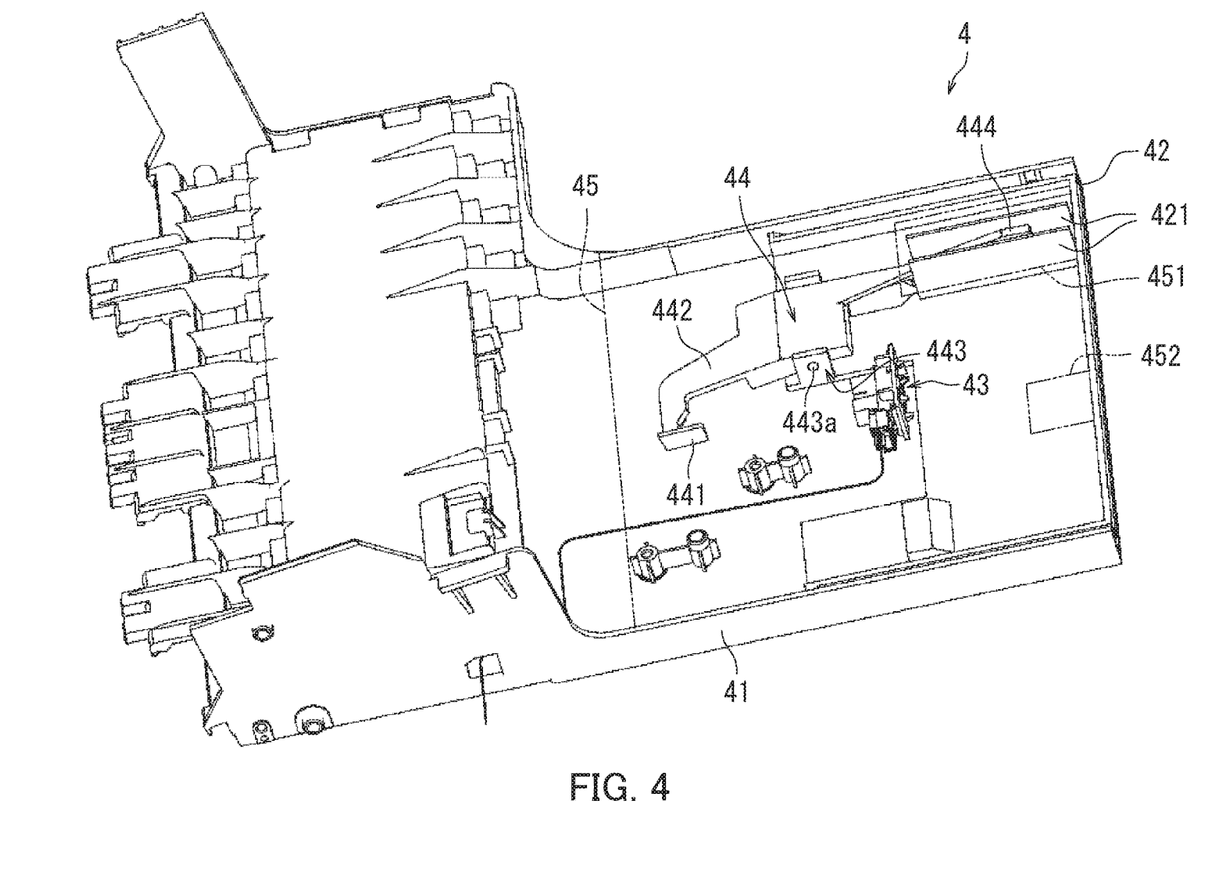
FIG. 4 is a perspective view of the feed tray as viewed from the reverse side thereof in a state in which an extension table is accommodated.

Configuration of main components of the feed tray 4 will be described next with reference to FIGS. 1, 3, and 4. FIG. 4 is a perspective view of the feed tray 4 as viewed from the reverse side thereof in a state in which the extension table 42 is accommodated. FIG. 4 illustrates the feed tray 4 in a state in which the lower cover 45 is removed from the fixed table 41 for the sake of explanation. However, the lower cover 45 is indicated by a dashed and double dotted line in order to indicate respective positions of the first and second concave cutes 451 and 452. As illustrated in FIG. 4, the feed tray 4 further includes a sensor 43 and an actuator 44.

The sensor 43 detects whether or not an original document R is placed on the extension table 42. The sensor 43 is disposed on the fixed table 41. Specifically, the sensor 43 is an optical transmission sensor. Detection signals of the sensor 43 are transmitted to the controller 5.

The controller 5 determines whether or not an original document R is placed on the extension table 42 based on the detection signals from the sensor 43.

The actuator 44 blocks transmission of light projected in the sensor 43 when no original document R is placed on the extension table 42. The actuator 44 allows light projected in the sensor 43 to be transmitted when an original document R is placed on the extension table 42. The actuator 44 is disposed on the extension table 42. The actuator 44 includes a blocking member 441, a swing member 442, a support member 443, and a connection member 444.

The support member 443 is fixed to the extension table 42 and supports the swing member 442 in a swingable manner. Specifically, the support member 443 includes a support shaft 443a. The support shaft 443a is disposed substantially in parallel to a lower surface of the extension table 42. The support shaft 443a extends in a direction substantially perpendicular to a direction in which the extension table 42 is pulled out.

The swing member 442 is supported by the support member 443. Further, the swing member 442 swings about the support shaft 443a as a swing axis. The swing member 442 extends substantially in parallel to the direction in which the extension table 42 is pulled out and is integral with the connection member 444 and the blocking member 441.

The connection member 444 is located at an end of the swing member 442 on a side of a tip end of the extension table 42 and connects the swing member 442 to the protruding member 445 illustrated in FIG. 3. Specifically, the connection member 444 is integral with the protruding member 445.

The extension table 42 includes a pair of protection members 421 each having a plate-like shape. The pair of protection members 421 stands on the lower surface of the extension table 42 to protrude downward. The protection members 421 face respective opposite surfaces of the connection member 444. The protection members 421 prevent the connection member 444 from being touched by a user. In a state in which the extension table 42 is accommodated between the fixed table 41 and the lower cover 45, the protection members 421 are accommodated in the first concave cut 451.

The blocking member 441 is disposed at an end of the swing member 442 on a side of the based end of the fixed table 41 and blocks transmission of projected light in the sensor 43. Specifically, the blocking member 441 is a flat plate-shaped member substantially perpendicular to light projected in the sensor 43. In a state in which the extension table 42 is accommodated, the blocking member 441 is positioned away from the sensor 43 on a side of the base end of the fixed table 41, as illustrated in FIG. 4.

As has been described so far with reference to FIGS. 1-4, the sensor 43 detects the presence or absence of an original document R on the extension table 42 in the present embodiment. In the above configuration in which the sensor 43 is disposed on the fixed table 41, wiring of the sensor 43 can be simplified when compared to a configuration in which the sensor 43 is disposed on the extension table 42.

As described with reference to FIG. 2, the feed tray 4 is disposed at the document conveyance unit 3. In the above configuration, wiring of the sensor 43, which detects the presence or absence of an original document R on the extension table 42 of the feed tray 4 of the document conveyance unit 3, can be simplified.

As described with reference to FIGS. 1 and 2, the feed tray 4 is disposed at the document conveyance unit 3 in the present embodiment, which however should not be taken to limit the present disclosure. It is only require that the feed tray 4 is disposed in the image forming apparatus 100. For example, the feed tray 4 may be disposed as the manual feed tray 11. In the above configuration, paper P is placed on the feed tray 4. In the above configuration, wiring of the sensor 43, which detects the presence or absence of paper P on the extension table 42 of the manual feed tray 11, can be simplified. Note that the conveyor device 13 corresponds to a "sheet conveyor device" in the above configuration.

Figure 5:
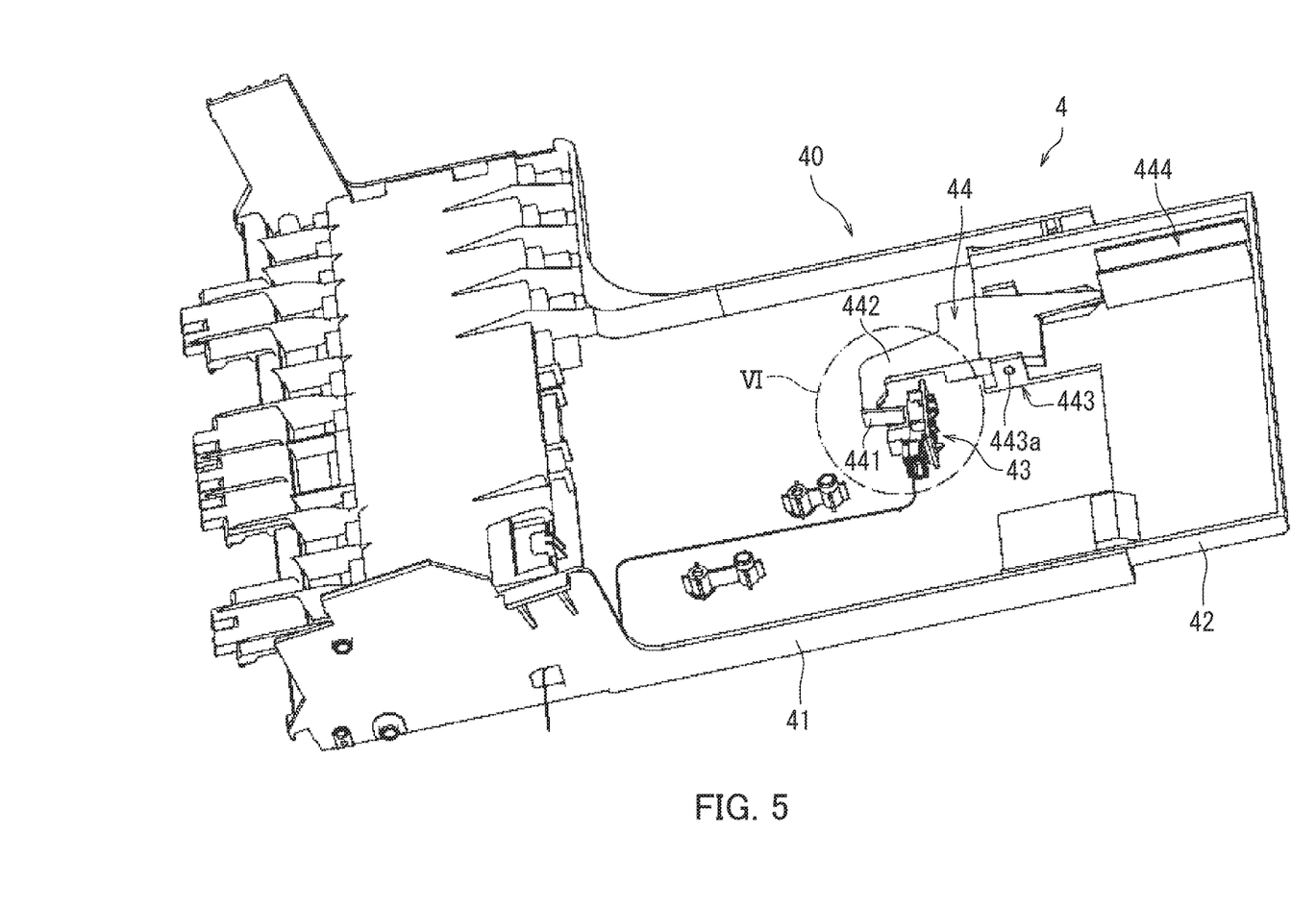
FIG. 5 is a perspective view of the feed tray as viewed from the reverse side thereof in a state in which the extension table is pulled out.
Figure 6:
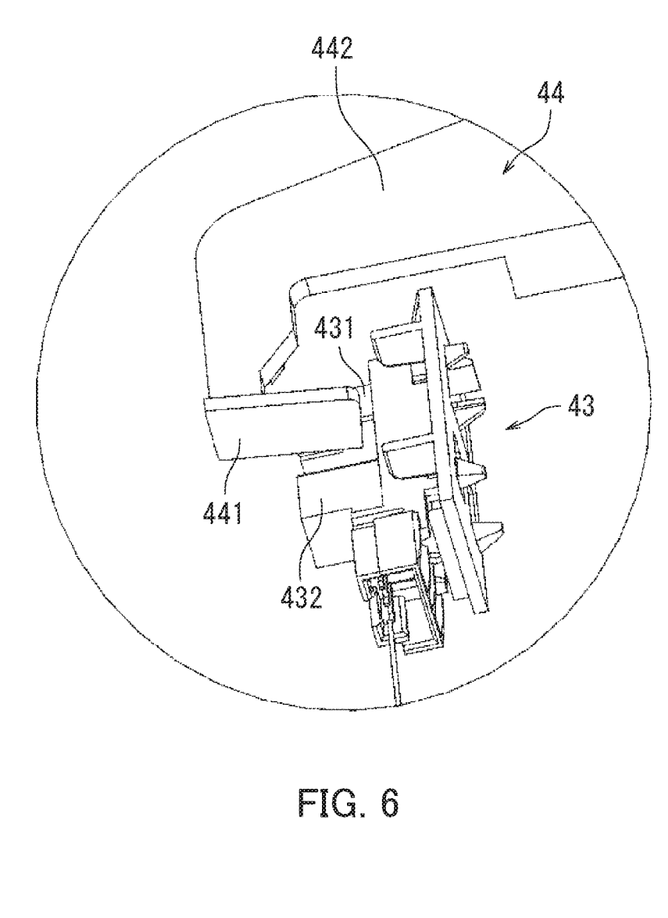
FIG. 6 is an enlarged view of a region VI in the vicinity of a sensor illustrated in FIG. 5.

The following describes next the feed tray 4 in a situation in which no original document R is placed on the extension table 42 with reference to FIGS. 1, 3, 5, and 6. FIGS. 5 and 6 each illustrate the feed tray 4 in a state in which no original document R is placed on the extension table 42. FIG. 5 is a perspective view of the feed tray 4 as viewed from the reverse side thereof in a state in which the extension table 42 is pulled out. The lower cover 45 is not illustrated also in FIG. 5 for the sake of explanation. FIG. 6 is an enlarged view of a region VI in the vicinity of the sensor 43 illustrated in FIG. 5.

The actuator 44 is disposed on the extension table 42. In the above configuration, when the extension table 42 is pulled out, the actuator 44 is moved toward the tip end of the fixed table 41 relative to a position of the actuator 44 when the extension table 42 is accommodated. As a result, the blocking member 441 is located at a position downwardly separate from the sensor 43, as illustrated in FIG. 6.

The sensor 43 includes a photo transmitter 431 and a photo receiver 432. The photo transmitter 431 includes for example an LED and emits (projects) light toward the photo receiver 432. The photo receiver 432 includes for example a phototransistor and detects light projected from the photo transmitter 431.

As illustrated in FIG. 6, the blocking member 441 allows transmission of light projected from the photo transmitter 431. Specifically, the blocking member 441 is not positioned between the photo transmitter 431 and the photo receiver 432. In the above situation, the photo receiver 432 detects light projected from the photo transmitter 431 and transmits detection signals indicating light detection to the controller 5. The controller 5 accordingly determines that no original document R is placed on the extension table 42.

Figure 7:
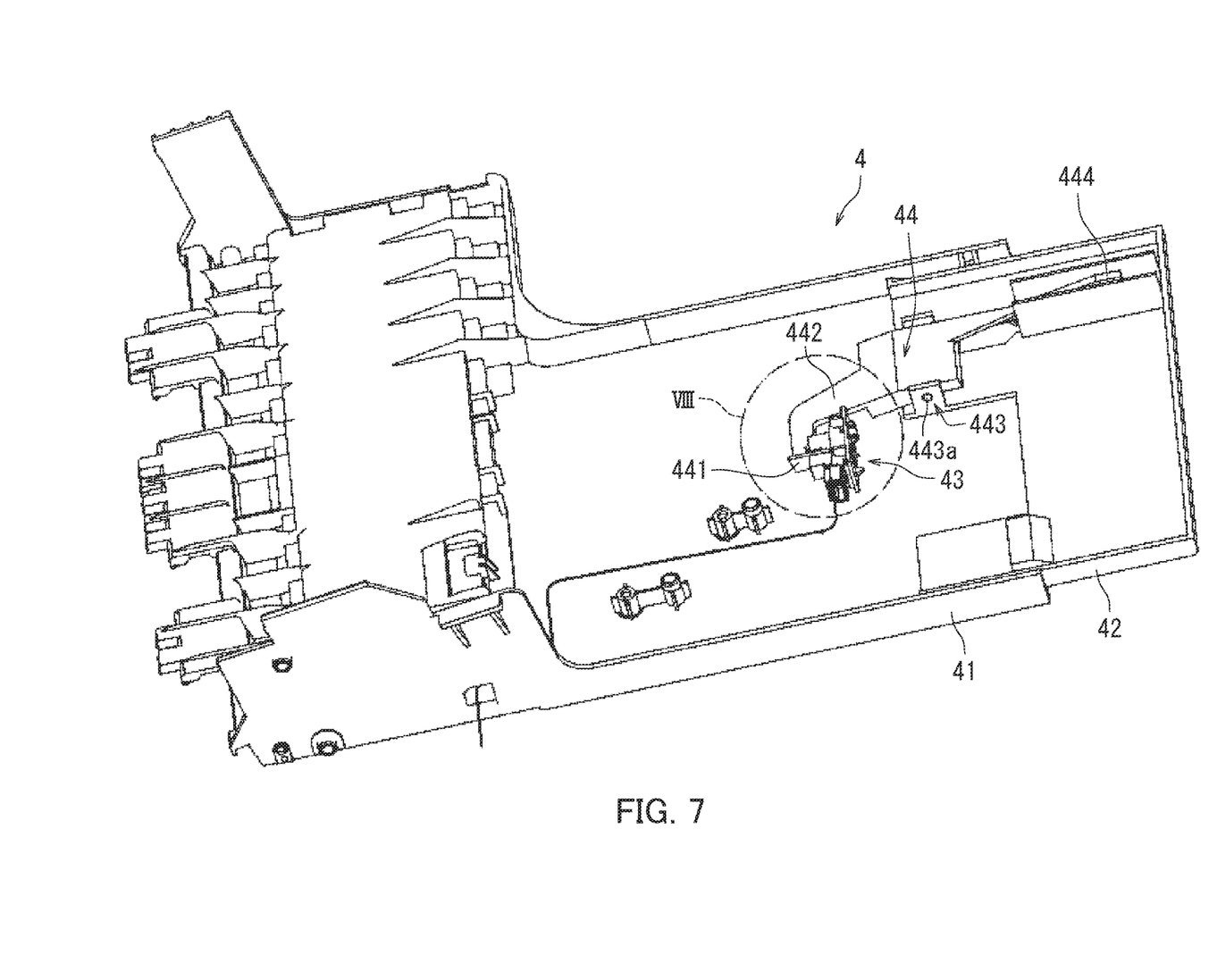
FIG. 7 is a perspective view of the feed tray as viewed from the reverse side thereof in a state in which an original document is placed on the extension table.
Figure 8:
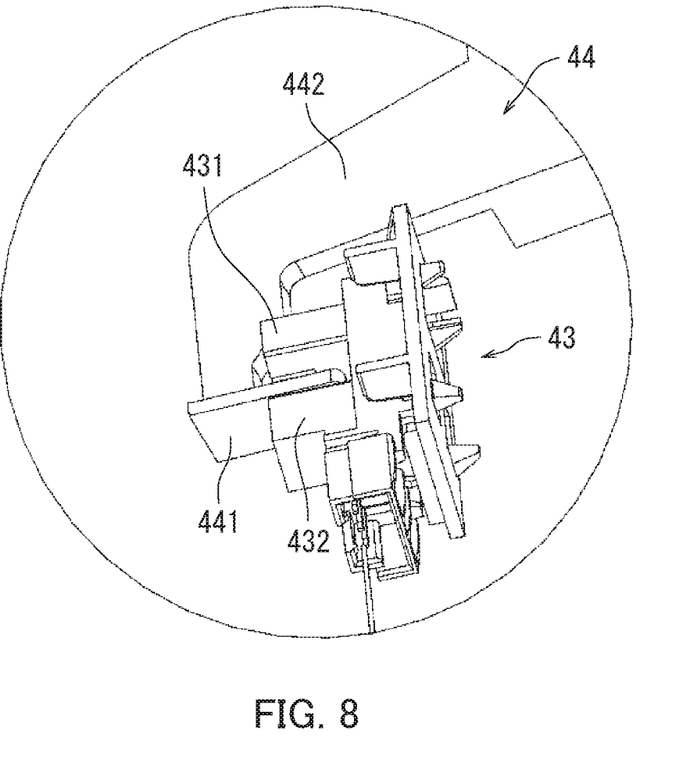
FIG. 8 is an enlarged view of a region VIII in the vicinity of the sensor illustrated in FIG. 7.

The following describes next the feed tray 4 in a situation in which an original document R is placed on the extension table 42 with reference to FIGS. 1, 3, 7, and 8. FIGS. 7 and 8 each illustrate the feed tray 4 in a state in which an original document R is placed on the extension table 42. FIG. 7 is a perspective view of the feed tray 4 as viewed from the reverse side thereof in a state in which the extension table 24 is pulled out. The lower cover 45 is not illustrated also in FIG. 7 for the sake of explanation. FIG. 8 is an enlarged view of a region VIII in the vicinity of the sensor 43 illustrated in FIG. 7.

In a situation in which an original document R is placed on the extension table 42, the protruding member 445 is pushed downward by the original document R until an upper end of the protruding member 445 recedes to be aligned with the placement surface of the extension table 42. As a result, the connection member 444 moves away from the lower surface of the extension table 42 to swing the swing member 442.

Specifically, the swing member 442 swings to move the blocking member 441 from the position downwardly separate from the sensor 43 to a position between the photo transmitter 431 and the photo receiver 432. That is, the connection member 444 moves in a direction away from the lower surface of the extension table 42 and the blocking member 441 moves to the position between the photo transmitter 431 and the photo receiver 432.

As a result, the blocking member 441 blocks transmission of light projected from the photo transmitter 431, as illustrated in FIG. 8. As such, the photo receiver 432 does not detects light projected from the photo transmitter 431 and the sensor 43 accordingly transmits detection signals indicating no light detection to the controller 5. The controller 5 accordingly determines that the original document R is placed on the extension table 42.

As has been described so far with reference to FIGS. 3-6, the actuator 44 blocks transmission of projected light in the sensor 43 when the protruding member 445 is pushed downward by an original document R placed on the extension table 42, and allows transmission of projected light in the sensor 43 when no original document R is placed on the extension table 42. In the above configuration, detection as to whether or not an original document R is placed on the extension table 42 can be made according to whether or not projected light in the sensor 43 is blocked. As a result, the presence or absence of an original document R on the extension table 42 can be detected with a simple configuration.

Furthermore, the protruding member 445 is pushed downward by an original document R placed on the extension table 42 to push one end of ends of the swing member 442 (the connection member 444), as described with reference to FIGS. 7 and 8. As a result, the swing member 442 swings and transmission of projected light is blocked in the sensor 43 according to the position of the other end of the swing member 442 (the blocking member 441). In the above configuration, the presence or absence of an original document R on the extension table 42 can be detected with a simple configuration.

As described with reference to FIGS. 3 and 4, the swing member 442 swings about the support member 443 fixed to the extension table 42 as a pivot. In the above configuration, even when the extension table 42 is pulled out along or accommodated under the fixed table 41, the protruding member 445 is not changed in position relative to the extension table 42. As such, a through hole in the placement surface of the extension table 42, through which the protruding member 445 protrudes, can be reduced in size. As a result, reduction in strength of the placement surface of the extension table 42 can be prevented. Moreover, the swing member 442 swings in a direction toward and away from the fixed table 41 and the extension table 42. In the above configuration, pushing force applied to the protruding member 445 can cause the swing member 442 to swing. As a result, the presence or absence of an original document R on the extension table 42 can be detected with a simple configuration.

As described with reference to FIG. 4, the support shaft 443a extends substantially in parallel with the placement surface of the extension table 42 and in a direction substantially perpendicular to the direction in which the extension table 42 is pulled out. Further, the swing member 442 sings about the support shaft 443a as a swing axis. The above configuration can allow the swing member 442 to swing in a direction toward and away from the fixed table 41 and the extension table 42. As a result, the presence or absence of an original document R on the extension table 42 can be detected with a simple configuration.

As described further with reference to FIG. 4, the actuator 44 includes the blocking member 441 that blocks transmission of light projected from the photo transmitter 431 of the sensor 43. The blocking member 441 is disposed on the other end of the swing member 442. Furthermore, the blocking member 441 is a flat plate-shaped member substantially perpendicular to light projected the photo transmitter 431 of the sensor 43. In the above configuration, swing of the swing member 442 can cause the blocking member 441 to block or allow transmission light projected from the photo transmitter 431 of the sensor 43. As a result, it can be ensured that whether or not light projected the photo transmitter 431 of is blocked in the sensor 43. Thus, the presence or absence of an original document R on the extension table 42 can be detected accurately.

The embodiment of the present disclosure has been described so far with reference to the drawings. However, the present disclosure is not limited to the above-described embodiment and can be practiced in various ways within the scope without departing from the essence of the present disclosure (for example, (1)-(6) below). The drawings are schematic illustrations that emphasize elements of configuration in order to facilitate understanding thereof, and properties of elements of configuration illustrated in the drawings, such as thickness, length, and number thereof, may differ from actual properties thereof in order to facilitate preparation of the drawings. Shapes, dimensions, etc. of the elements of configuration given in the above embodiment are merely examples that do not impart any particular limitations and may be altered in various ways, so long as such alterations do not substantially deviate from the configuration of the present disclosure.

(1) As described with reference to FIGS. 1 and 2, the image forming apparatus 100 is a multifunction peripheral, which however should not be taken to limit the present disclosure. It is only required that the image forming apparatus 100 includes the feed tray 4. The image forming apparatus 100 may be for example a scanner. Alternatively, the image forming apparatus 100 may be for example a printer.

(2) As described with reference to FIGS. 3-8, the sensor 43 is an optical transmission sensor, which however should not be taken to limit the present disclosure. It is only required that the sensor 43 is capable of detecting the blocking member 441. For example, the sensor 43 may be an optical reflective sensor. Alternatively, the sensor 43 may be for example a proximity sensor.

(3) As described with reference to FIGS. 3-8, the actuator 44 includes the swing member 442, which however should not be taken to limit the present disclosure. It is only required that whether the actuator 44 blocks or allows transmission of projected light in the sensor 43 according to whether or not an original document R is placed on the extension table 42. For example, the actuator 44 may include a slide member that slides in a direction parallel to the lower surface of the extension table 42 in response to an original document R being placed on the extension table 42. In the above configuration, transmission of projected light in the sensor 43 is blocked or allowed according to a position of the slide member.

(4) As described with reference to FIGS. 3-8, the swing member 442 swings in the direction toward and away from the fixed table 41 and the extension table 42, which however should not be taken to limit the present disclosure. It is only required that the swing member 442 swings in response to the protruding member 445 being pushed. The swing member 442 may swing for example in a direction parallel to the lower surface of the extension table 42.

(5) As described with reference to FIGS. 3-8, the actuator 44 includes the blocking member 441, which however should not be taken to limit the present disclosure. It is only required that the actuator 44 blocks and allows transmission of projected light in the sensor 43 according to whether or not an original document R is placed on the extension table 42. For example, the actuator 44 may include a slide member that slides in a direction parallel to the lower surface of the extension table 42 in response to an original document R being placed on the extension table 42. In the above configuration, projected light is blocked or allowed in the sensor 43 according to a position of the slide member.

(6) As described with reference to FIGS. 3-8, it is determined that no original document R is placed on the extension table 42 when the photo receiver 432 does not receive light projected from the photo transmitter 431 in the sensor 43, which however should not be taken to limit the present disclosure. It may be determined that an original document R is placed on the extension table 42 when the photo receiver receives light projected from the photo transmitter 431 in the sensor 43.

What is claimed is:

1. An image forming apparatus comprising a feed tray having a placement surface on which a sheet is placed, wherein
the feed tray includes:
a fixed table;
an extension table capable of being pulled out along and being accommodated in the fixed table; and
a sensor disposed on the fixed table and configured to detect whether or not the sheet is placed on the extension table in a situation in which the extension table is pulled out,
the sensor is an optical transmission or reflective sensor, the feed tray includes an actuator that moves according to whether or not the sheet is placed on the extension table, transmission of projected light being blocked or allowed in the sensor according to movement of the actuator, the actuator includes a protruding member capable of protruding from and receding below the placement surface of the extension table, and the protruding member protrudes from or recedes below the placement surface of the extension table according to whether or not the sheet is placed on the extension table.

2. The image forming apparatus according to claim 1, wherein the actuator further includes a swing member that swings in response to the protruding member being pushed, the swing member has opposite ends one end of which is integral with the protruding member, and whether transmission of the projected light is blocked or allowed in the sensor is determined according to a position of the other end of the opposite ends of the swing member.

3. The image forming apparatus according to claim 2, wherein the actuator further includes a support member fixed to the extension table, and the swing member swings about the support member as a pivot in a direction toward and away from a lower surface of the extension table.

4. The image forming apparatus according to claim 3, wherein the support member includes a support shaft disposed substantially in parallel to the placement surface of the extension table and extending in a direction perpendicular to a direction in which the extension table is pulled out, and the swing member swings about the support shaft as a swing axis.

5. The image forming apparatus according to claim 2, wherein the actuator further includes a blocking member at the other end of the opposite ends of the swing member that blocks transmission of the light projected in the sensor, and the blocking member is a flat plate-shaped member substantially perpendicular to the light projected in the sensor.

6. The image forming apparatus according to claim 5, wherein the sensor is an optical transmission sensor and includes a photo transmitter and a photo receiver, and when the blocking member is positioned between the photo transmitter and the photo receiver and the photo receiver does not receive the light projected from the photo transmitter, the sensor detects that the sheet is placed on the extension table.

7. The image forming apparatus according to claim 1, wherein the extension table includes a pair of protection members each standing on a lower surface of the extension table, the protruding member is a plate-shaped member extending in a direction perpendicular to the placement surface of the extension table, and the protection members face respective opposite side surfaces of the protruding member.

8. The image forming apparatus according to claim 1, further comprising:

an image reading section configured to read an image formed on the sheet; and a sheet conveyor device configured to convey the sheet to the image reading section, wherein the feed tray is disposed at the sheet conveyor device.

9. The image forming apparatus according to claim 1, further comprising:

an image forming device configured to form an image on the sheet;

a sheet conveyor device configured to convey the sheet to the image forming device; and a feeder configured to feed the sheet placed on the feed tray to the sheet conveyor device.

* * * * *